Nov. 5, 1940.          P. J. HOGAN                 2,220,717
                JOURNAL BEARING STRUCTURE
                  Filed Sept. 1, 1939
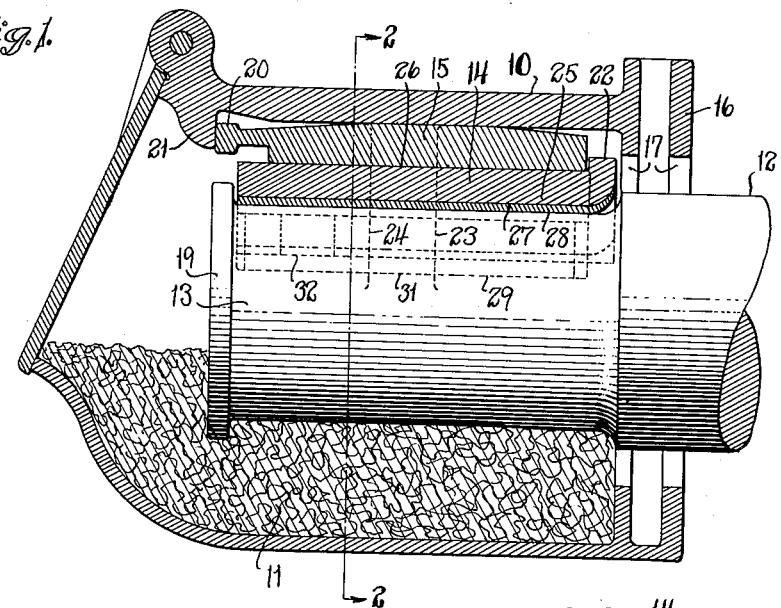
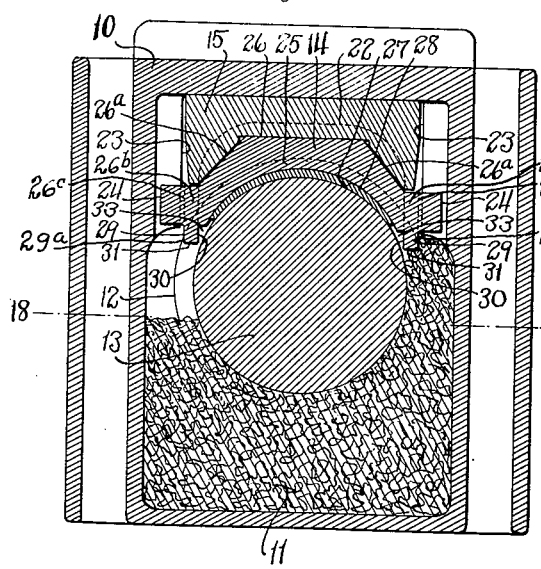
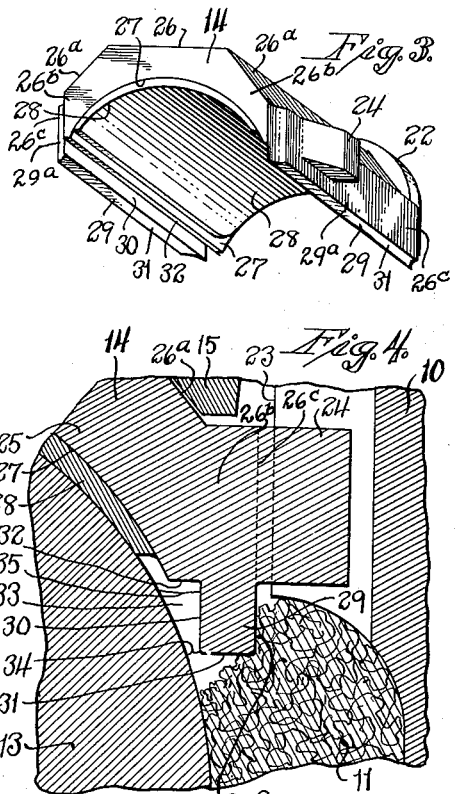
Inventor
Patrick J. Hogan
Seymour Earle Nichols
Attorneys Patented Nov. 5, 1940

2,220,717

UNITED STATES PATENT OFFICE 2,220,717

JOURNAL BEARING STRUCTURE

Patrick J. Hogan, New Haven, Conn.

Application September 1, 1939, Serial No. 293,026

5 Claims. (Cl. 308—89)

The present invention relates to improvements in journal bearing structures, and especially to improved journal bearing structures for railway rolling-stock. More particularly, this invention provides a superior journal bearing structure wherein oil-saturated lubricating-packing may be carried, which structure is designed to secure adequate and efficient distribution of oil from the said packing to a bearing-member or journal-bearing and between the same and the surface of a rotating axle, or shaft engaging therewith, and which, at the same time, effectively minimizes or prevents conditions known as "waste-grabs"; these being caused by particles or portions of the lubricating-packing lodging between the axle and its bearing-member, and wherefrom excessive overheating and "hot-boxes" develop.

Among the causes of so-called "waste-grabs" are: the action of a rotating axle or shaft in the direction of train movement or at the "inbound" side of the axle, in picking up and carrying waste particles or portions toward and to the bearing-member for the axle; the action of the rotating axle and jars that occur in the course of train movements; impacts that take place during certain of the operations of trains such as switching operations, and which are likely to cause packing-material to be moved upwardly toward the bearing-member for the axle. Frequently, because of jar or impact, the bearing-member may move somewhat with respect to the axle and packing-material which, at that time, for any of the foregoing or other reasons, may be at the junction of the axle, and its bearing-member will be carried between and will be "grabbed" by the adjacent surfaces of the axle and bearing-member.

One of the objects of the present invention is to provide a superior journal bearing structure including means positioned adjacent to and extending along at least a substantial extent of the length of a journaling-portion of an axle or shaft to engage with and outwardly-deflect, along the length thereof, oil-saturated packing-material clinging to a rotating axle, or shaft.

A further object of this invention is to provide a superior journal-bearing structure of the character described having means for engaging with and outwardly-deflecting oil-soaked lubricating-waste, in the first phase or half of an upper "inbound" reach of a rotating axle or shaft with respect to a journal-bearing, or "journal-brass," therefor.

Another of the objects of the present invention is to provide a superior journal bearing structure designed to function as above described and provided with means positioned adjacent to and spaced from a journaling-portion of an axle, whereby lubricant picked up by a rotating axle may be carried thereby, free of interference, to a bearing-member and between the same and the surface of the axle engaging therewith.

Still another object of this invention is to provide a superior journal bearing structure having means of the nature described above, and which means is so constructed, arranged, and positioned with respect to an axle as to guide and return excess oil from a bearing-member to the surface of the axle.

A further object of the present invention is to provide a superior journal bearing structure in which fine or fuzzy particles of lubricating-waste, which may possibly escape the described outwardly-deflecting action of the structure, may be acted on before reaching interengaging surfaces of a rotating axle, or shaft, and a bearing-member therefor, and which particles are caused to be carried outwardly of and away from the said axle and its bearing-member.

A still further object of the present invention is to provide a superior journal bearing structure constructed and arranged that fuzzy or fine particles of oil-soaked packing-material, which may possibly escape positive outward-deflecting action and cling to a rotating axle, are acted on by back-pressure, or air-flow, or eddy-currents developed by a rotating axle in a pocket provided adjacent to and extending along the "inbound" side of the axle, and are blown or caused to be moved thereby outwardly of and away from the said axle and a bearing-member therefor.

It is also among the objects of this invention to provide a superior journal bearing structure, which may, conveniently and without difficulty, be produced for all standard sizes of railway-car axles, and may be readily applied thereto, and at no greater, or appreciably greater, cost above the cost of existing journal bearing structures, the structure of the present invention being durable, and of rugged nature and having capacity to withstand rough usage and handling, which is generally incidental to the use thereof.

With the above and other objects in view, as will appear to those skilled in the art from the present disclosure, this invention includes all features in the said disclosure which are novel over the prior art.

In the accompanying drawing, in which certain modes of carrying out the present invention are shown for illustrative purposes:

Fig. 1 is a vertical central-longitudinal view partly in section and partly in side elevation, of a journal bearing structure embodying the present invention;

Fig. 2 is a transverse vertical section taken on the line 2—2 of Fig. 1;

Fig. 3 is a perspective view of the improved bearing-member of the structure; and Fig. 4 is an enlarged fragmentary sectional view of a portion of the axle or shaft together with one of the adjacent guard-lips.

Before describing the construction embodied in the drawing herein, it may be observed, that certain efforts are known to have been made with respect to overcoming "waste-grabs." For example, a separate shield or protector has been proposed for the bearing-member, the sides of the shield being provided at widely-spaced intervals therealong, with projections turned inwardly toward and engaging an axle, and consequently, acting only at the said widely-spaced and engaging points to free waste-particles clinging to the axle as the latter rotates. In another instance, it has been proposed with respect to the usual anti-friction liner of a bearing-member to form the same with longitudinal-grooves intended to serve as collection-traps for waste particles. In still another example, it has been proposed to provide the anti-friction liner with ducts communicating with passages in a bearing-member, the passages being intercommunicating, it being contemplated that at one side of a rotating-axle and between the same and its bearing-member, waste particles may pass upwardly through certain of the ducts to one of the said passages, and thence through another of the passages and others of the ducts to pass outwardly at the opposite side of the axle.

Apparently though, neither of the above-described devices, nor any other, has provided a commercially-acceptable remedy of the difficulty for none has received the adoption to be expected of an expedient which successfully copes with "waste-grabs," and the difficulty has until now remained serious, manifesting itself many times day after day in the nature of excessive overheating and "hot-boxes," which add materially to the maintenance expense of railroads, and which also cause undesirable schedule disruptions.

The journal bearing structure shown herein which is designed to provide a practical answer to the problems mentioned above, includes, in accordance generally with standard practice: a journal-box, designated as a whole by the reference character 10, and containing a mass of oil-saturated lubricating-waste, or packing-material 11, packed principally in the lower portion of the said journal-box; an axle 12, having a journaling-portion 13 arranged to extend in the journal-box 10, with the lower portion thereof bedded in the lubricating-waste or packing-material 11; a bearing-member, or journal-bearing, or "journal-brass" for the axle, generally designated by the reference character 14 and mounted on and about the upper surface of the journaling-portion 13 of the axle, within the said journal-box; and a retainer-wedge or retainer-key 15 for securely holding the bearing-member 14 in place in the journal-box 10 and on the said journaling-portion 13.

Preferably, the journal-box 10 is of usual or standard "A. A. R." construction and is provided in the rear wall 16 thereof with a central axle-opening 17 for passage of the said journaling-portion 13 therethrough. As is shown particularly well in Figs. 1 and 2, the journaling-portion 13 extends longitudinally within the journal-box 10 and the lower portion thereof is bedded in the mass of packing-material 11 packed in the lower half of the journal-box 10. The packing-material or lubricating-waste 11 may be of any desirable composition and may comprise remnants or scraps of cotton, wool, hemp or other fiber-like or strand-like material adapted to be saturated or soaked with lubricating-oil and to give up oil to the wiping action of the axle as it rotates with respect to and bears in the somewhat yielding mass of packing-material 11 which is packed about the journaling-portion, preferably, to about one inch below the center line of the axle, as indicated by the line 18—18 in Fig. 2 of the drawing.

In the upper portion of the journal-box 10 the bearing-member 14 is mounted in substantially rigid and non-yielding relationship to the upper surface of the said journaling-portion 13. As clearly appears in Fig. 1, the free end of the journaling-portion 13, within the journal-box 10, is provided at the end thereof with an external stop-flange 19, and the bearing-member 14 extends between the said stop-flange 19 and the rear wall 16 of the said journal-box, the front face of the bearing-member 14 being located adjacent to the said stop-flange. The said bearing-member is securely held in place by the said retainer-key 15, which, as shown, is wedged between the top surface of the bearing-member 14 and the under surface of the top of the journal-box 10. The said retainer-key is provided with a forwardly-projecting positioning-lug 20, which abuts against an abutment-boss 21 depending interiorly of the journal-box 10 from the top thereof, and the rear face of the retainer-wedge 15 is thereby positioned adjacent to or in engagement with an upstanding semi-circular abutment-flange 22 provided on the bearing-member 14, whereby the said bearing-member may be restrained from forward movement in the journal-box 10 and relative to the journaling-portion 13 of the said axle. The journal-box 10 may also be provided with stop-ribs 23—23 respectively extending interiorly of and at opposite sides of the said journal-box, which stop-ribs are engaged by stop-wings 24—24 respectively extending laterally of and at opposite sides of the said bearing-member to substantially prevent rearward movement of the bearing-member 14 in the journal-box 10.

Referring more particularly to the bearing-member 14, and as is especially well shown in Figs. 2 and 3, the said journal-bearing or bearing-member includes a bearing-pad portion or brass shell 25, which has its top surface formed to provide a central-flat 26 and opposite sloped sides 26a—26a extending longitudinally and corresponding to and engaged by similarly-formed under-surface portions of the retainer-key 15. The under surface 27 of the bearing-pad portion 25 is concavely curved throughout its length from one bottom side-edge thereof to its opposite bottom side-edge, approximately to the curvature of the upper surface of the journaling-portion 13 of the axle 12, and the said under-surface 27 has fitted thereto a liner 28 of anti-friction metal. The anti-friction liner 28 which is composed of white-metal, or babbitt-metal, extends longitudinally throughout substantially the entire length of the bearing-pad portion 25 and transversely thereof, preferably, from a point adjacent to and spaced inwardly of one bottom side-edge of the said bearing-pad portion, to a point adjacent to and spaced inwardly of the opposite side-edge of the bearing-pad portion 25. The anti-friction liner 28, as will be understood, may be carried by the bearing-pad portion 25 by being amalgamated with the concave under-surface 27 thereof, or by being replaceably secured thereto.

The bearing-member or journal-bearing 14 has opposite side-portions 26b provided with outer side-faces 26c. Depending from the side-portions 26b are rigid block-like waste-deflecting or waste-restraining guard-lips or lugs or flanges 29. The outer face 29a of each guard-lip 29 is substantially in the same plane as the outer face 26c of the side-portion 26b from which it depends. The portions of the outer faces 26c and 29a which are between the stop-ribs or stop-members 23 and in a location to engage against the stop-members during attempted rocking movement of the journal-bearing 14 caused by sudden stopping or starting of the car on which the journal-bearing is mounted, act to limit or minimize the rocking movement of the bearing-pad and thus reduce the chances of "waste-grabs" occurring. Inasmuch as the bearing-member is practically always a casting composed of brass, bronze or other hard material, it is preferred to cast the said block-like guard-lips 29—29 integrally with the bearing-pad portion 25 of the said bearing-member. It has also been found desirable to extend the said guard-lips along the greater portion of the length of the bearing-member 14, the guard-lips 29 being shown in the form of the invention illustrated, as extending throughout substantially the entire length of the bearing-member 14, at the respective opposite sides thereof.

As is clearly shown in Figs. 2 and 3, the guard-lips 29 are spatially-related to the concave under-surface 27 of the bearing-pad portion 25 and extend substantially tangentially thereto, the inner-faces 30—30 of the said guard-lips lying in substantially-vertical planes that respectively intersect opposite portions of the surface of the journaling-portion 13 of the axle. The guard-lips 29 depend adjacent to opposite sides of the said journaling-portion, and the lowermost portions of the inner faces 30 of the said guard-lips closely approach but do not engage with the surface of the axle. The vertical height of the said inner faces of the guard-lips 29, depending below the said bearing-pad portion 25, is at least as great as the lateral extension of the horizontal end-faces 31—31 thereof, and, preferably, the inner face 30 of each guard-lip 29 is of such height that the said guard-lip terminates downwardly from the top of the axle at a point more than one-half of the distance to the center of the journaling-portion 13 of the axle.

The sides 26a of the bearing-pad portion 25 and the bottom end-faces 32 thereof extend wholly between the body of the bearing-pad portion 25 and the block-like guard-lips 29 and offset the said block-like guard-lips laterally outwardly with respect to the body of the said bearing-pad portion and with respect to adjacent portions of the axle 12, whereby pockets 33—33 are provided, respectively located at opposite sides of and between the axle 12 and the guard-lips 29. The lower portions of the inner faces 30—30 of the said guard-lips and opposite portions of the axle closely adjacent thereto provide constricted throat-portions 34—34 for the respective pockets 33, and the portions of the said inner faces adjacent the bearing-pad portion 25, together with portions of the axle curving inwardly with respect to the inner faces 30 provide the said pockets 33 respectively with enlarged portions 35—35. The said pockets 33 cooperate with and supplement the guard-lips 29 in preventing waste-particles being carried by the axle to the bearing-pad portion 25 of the bearing-member, and between the interengaging surfaces of the said axle and the liner 28 of the said bearing-pad portion, as will be presently described.

Apparently the tendency of particles or portions of the lubricating-waste 11 to become loosened with respect to the packed-mass and to separate therefrom and to move upwardly with respect to and toward the bearing-member 14 because of jars or impacts such as occur in train movements, or in switching operations, or by clinging to the journaling-portion of the axle 12 as the latter rotates, exhibits itself principally at and adjacent to the upper surface of the packing-material, i. e., at a point substantially one inch below the horizontal center-line of the axle, and at the side of the axle which is "inbound" with respect to the bearing-member 14. For purpose of illustration, the said "inbound" side has been shown in Fig. 2 as the right-hand side of the axle, the direction of rotation of the axle being in a counterclockwise direction as viewed in the said Fig. 2, and the description that follows deals, for purposes of example only, with the condition in which particles or portions of lubricating-waste tend to cling to a rotating axle, it being understood that substantially the same action takes place with respect to packing-material dislodged from its normal position for various other causes such as jars or impacts that occur during train movements and switching operations.

It may be said that the "inbound" travel of the axle comprises two reaches, a first or lower "inbound" reach from approximately bottom dead-center to the horizontal center-line, and a second or upper "inbound" reach from the said horizontal center-line to top dead-center. Accordingly, it is principally in the last phase or last half of the first or lower "inbound" reach that particles or portions of the packing-material 11 tend to become loosened from and to separate from the packed body of the waste-material, and are taken up by and cling to the rotating axle.

Because of the described construction and arrangement of the guard-lips 29, each of which preferably terminates downwardly from the top of the axle at a point more than one half of the distance to the center of the journaling-portion 13 of the said axle, each of the said guard-lips is so positioned, that the guard-lip 29 at the "inbound" side of the axle will be engaged by and will outwardly deflect oil-soaked waste particles clinging to the rotating axle in the first phase or first half of the second or upper of the "inbound" reaches of the axle. Or, to put it another way, packing-material picked up by the rotating axle in one phase of its "inbound" travel is caused to be deflected outwardly of and to be removed from the axle in the succeeding phase of its "inbound" travel, and before the axle reaches that part of its "inbound" movement in which it engages with the lining 28 of the bearing-pad portion 25 of the bearing-member. The described relationship and operation is illustrated in Fig. 2 in which the guard-lip 29 at the right-hand side is shown being engaged by and acting to outwardly-deflect waste material from the counterclockwise rotating axle, and into space present between the outer face of the said guard-lip and the inner surface of the adjacent side wall of the journal-box 10.

The positive outwardly-deflecting action provided by a guard-lip 29 at the "inbound" side of the axle 12 removes substantially all particles or portions of packing-material that are picked up by and cling to the axle. This positive action of a guard-lip is supplemented by what may be called a scavenging-action, which is caused by the rotating axle setting up a back-pressure, or air-flow, or eddy-currents in the enlarged portion 35 of the pocket 33 extending along the "inbound" side of the rotating axle, and which scavenging-action is effective at the constricted throat-portion 34 of the said pocket. The scavenging-action thus takes place a substantial distance in advance of the axle-engaging surface of the liner 28 of the bearing-member for the axle and causes fine or fuzzy particles or fibers, which may possibly escape the immediately-preceding positive action of the adjacent guard-lip, to be removed from the axle and to be blown or carried outwardly of and away from the axle and its bearing-member.

Because of the described positive action of the respective guard-lips 29 and the immediately-following scavenging action just described, the axle 12 is substantially entirely cleaned of portions of packing material 11 and the said guard-lips may be spaced from the axle and do not cause oil to be removed therefrom. Thus the rotating surface of the axle approaches and engages with the liner 28 of the bearing-member entirely clean and free of packing material shreds or fuzz and carries into its engagement with the liner only the desired film or surface covering of lubricant picked up by the axle from the said packing material.

Also, because the inner-faces 30 of the guard-lips extend substantially tangentially to the concave under surface 27 of the bearing-pad portion 25 and lie in vertical planes that respectively intersect opposite portions of the axle, excess oil issuing from between the axle and the liner 28 may flow along the said bearing-pad portion and onto the said guard-lips and pass therefrom to adjacent portions of the surface of the axle.

It may also be observed that the above-described results are those obtained in actual test practice. For this purpose several railway cars have been equipped with journal bearing structures embodying the design described herein. These have been subjected to exhaustive tests over an extensive period and the report thereon is to the effect that not a single instance of "hot-box" or any other trouble has developed in the tested structures as the result of so-called "waste-grabbing." From this it appears that the difficulties caused by "waste-grabs" and persisting despite other expedients, such as those mentioned herein, have now been effectively overcome principally because the structure as described is designed to act positively on waste material clinging to a rotating axle and outwardly deflect the same from the axle at a point in its "inbound" rotation removed from and substantially in advance of a bearing-pad portion of a bearing-member for the axle, and particularly substantially in advance of the point of engagement of the axle in its "inbound" movement, with an anti-friction liner of the said bearing-member.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The combination with an axle having an end-portion provided with a cylindrical journaling-portion and a journal-box receiving said end-portion and having stop-members at opposite sides thereof, of a journal-bearing mounted in said journal-box and having a curved surface supported on said cylindrical journaling-portion and including: opposite side-portions provided with outer side-face portions between said stop-members; and a pair of rigid waste-deflecting guard-lips, each rigid with and depending from one of said side-portions, each said guard-lip having an outer-face portion below and substantially in the same plane as the outer side-face portion of the side-portion from which it depends and adapted to engage one of said stop-members to limit rocking movement of the journal-bearing, and the lower end of each guard-lip extending substantially parallel to the longitudinal axis of the axle for a distance of most of the length of said cylindrical journaling-portion.

2. The combination with an axle having an end-portion provided with a cylindrical journaling-portion and a journal-box receiving said end-portion and having stop-members at opposite sides thereof, of a journal-bearing mounted in said journal-box and having a curved surface supported on said cylindrical journaling-portion and including: opposite side-portions provided with outer side-face portions between said stop-members; and a pair of rigid waste-deflecting guard-lips, each rigid with and depending from one of said side-portions, each said guard-lip having an outer-face portion below and substantially in the same plane as the outer side-face portion of the side-portion from which it depends and adapted to engage one of said stop-members to limit rocking movement of the journal-bearing, and the lower end of each guard-lip extending substantially parallel to the longitudinal axis of the axle for a distance of most of the length of said cylindrical journaling-portion, and the inner face and inner lower edge of each guard-lip being spaced a substantial distance from said journaling-portion.

3. The combination with an axle having an end-portion provided with a cylindrical journaling-portion and a journal-box receiving said end-portion, of a journal-bearing mounted in said journal-box and having a curved surface supported on said cylindrical journaling-portion and including: opposite side-portions; and a pair of rigid waste-deflecting guard-lips, each rigid with and depending from one of said side-portions, and the lower end of each guard-lip extending substantially parallel to the longitudinal axis of the axle for a distance of most of the length of said cylindrical journaling-portion, and the inner face and inner lower edge of each guard-lip being spaced a substantial distance from said journaling-portion and the lower end of each guard-lip being below the middle of the radius and well above the axis of said journaling-portion.

4. The combination with an axle having an end-portion provided with a cylindrical journaling-portion and a journal-box receiving said end-portion, of a journal-bearing mounted in said journal-box and having a curved surface supported on said cylindrical journaling-portion and including: opposite side-portions; and a pair of rigid waste-deflecting guard-lips, each rigid with and depending from one of said side-portions, and the inner face and inner lower edge of each guard-lip being spaced a substantial distance from said journaling-portion and cooperating with the axle to provide a pocket having a downwardly-open constricted throat, and the lower end of each guard-lip being below the middle of the radius and well above the axis of said journaling-portion.

5. The combination with an axle having an end-portion provided with a cylindrical journaling-portion and a journal-box receiving said end-portion and having stop-members at opposite sides thereof, of a journal-bearing mounted in said journal-box and having a curved surface supported on said cylindrical journaling-portion and including: opposite side-portions provided with outer side-face portions between said stop-members; and a pair of rigid waste-deflecting guard-lips, each rigid with and depending from one of said side-portions, each said guard-lip having an outer-face portion below and substantially in the same plane as the outer side-face portion of the side-portion from which it depends and adapted to engage one of said stop-members to limit rocking movement of the journal-bearing, and the lower end of each guard-lip extending substantially parallel to the longitudinal axis of the axle for a distance of most of the length of said cylindrical journaling-portion, and the inner face and inner lower edge of each guard-lip being spaced a substantial distance from said journaling-portion and cooperating with the axle to provide a pocket having a downwardly-open constricted throat, and the lower end of each guard-lip being below the middle of the radius and well above the axis of said journaling-portion.

PATRICK J. HOGAN.